Aug. 9, 1932.  J. HAMMERL  1,870,250

MOTOR VEHICLE

Filed Jan. 19, 1931

Inventor
JACOB HAMMERL

By
Attorney

Patented Aug. 9, 1932

1,870,250

UNITED STATES PATENT OFFICE

JACOB HAMMERL, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed January 19, 1931. Serial No. 509,681.

This invention relates in general to the method of and mechanism for installing window glass and more particularly for installing glass in the window frame of an automobile.

At present, in some types of closed automobile bodies having a window glass of the stationary type, the glass is provided with a channel-shaped rubber molding or binding, which is brought into sealing contact with the rear body panel at the rear window opening; however, this glass is not attached to the panel, but is supported in a window frame which is mounted on the body frame and which is spaced a short distance from the rear panel or body shell. In installing these windows, according to the present practice, the glass is held in place by hand, after the frame, rubber and panel have been smeared with a heavy sealing compound. The assembly is then cleated in this position and after the body has been trimmed, is secured in place by a molding which is inserted around the edges of the window glass on the inside of the body. The above procedure takes a great deal of time, results in dirty, smeared windows and is also frequently unsatisfactory, due to leaks occasioned because of an improper seal between the rubber and the body panel.

It is an object of the present invention, to provide an improved method of associating a glass pane with an automobile body which eliminates generally the above mentioned undesirable conditions.

Another object is to provide simple and efficient means for applying a glass pane to the body frame of an automobile.

A further object of the invention is to provide a temporary device for applying and holding a window pane in its assembled position so that an evenly distributed pressure is exerted on the edge portions of the window glass to force its rubber binding into intimate contact with the body panel without any danger of cracking or breaking the glass.

A still further object is to provide a device for applying a window glass to its frame which will materially reduce the length of time consumed in the installation.

Other objects and advantages will appear from a reading of the specification taken in connection with the accompanying single sheet of drawing in which.

Figure 1:
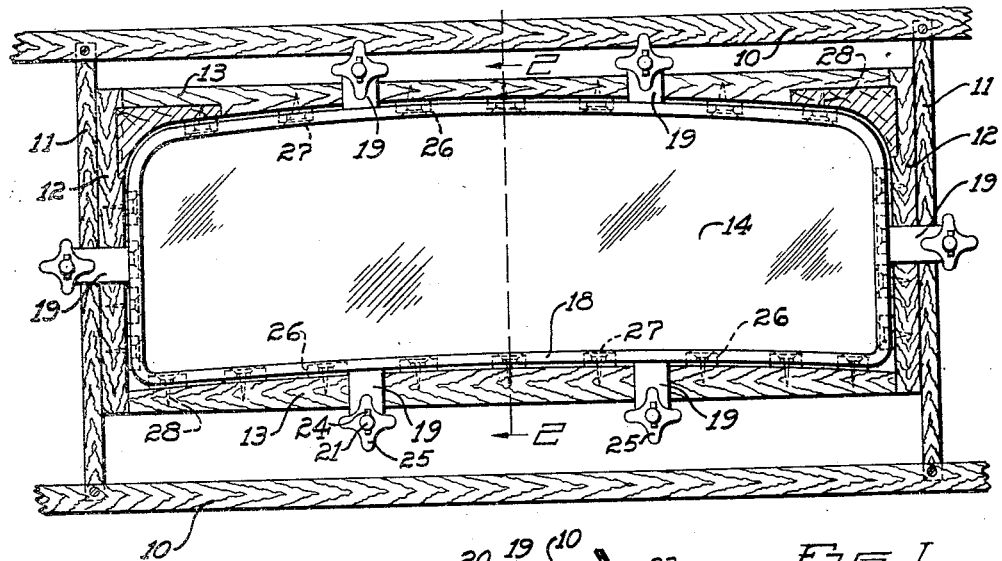
Fig. 1 is a front elevational view of a portion of the rear body frame of an automobile, the rear window frame, window glass and the clamp comprising the present invention, the clamp being shown in operative position.
Figure 2:
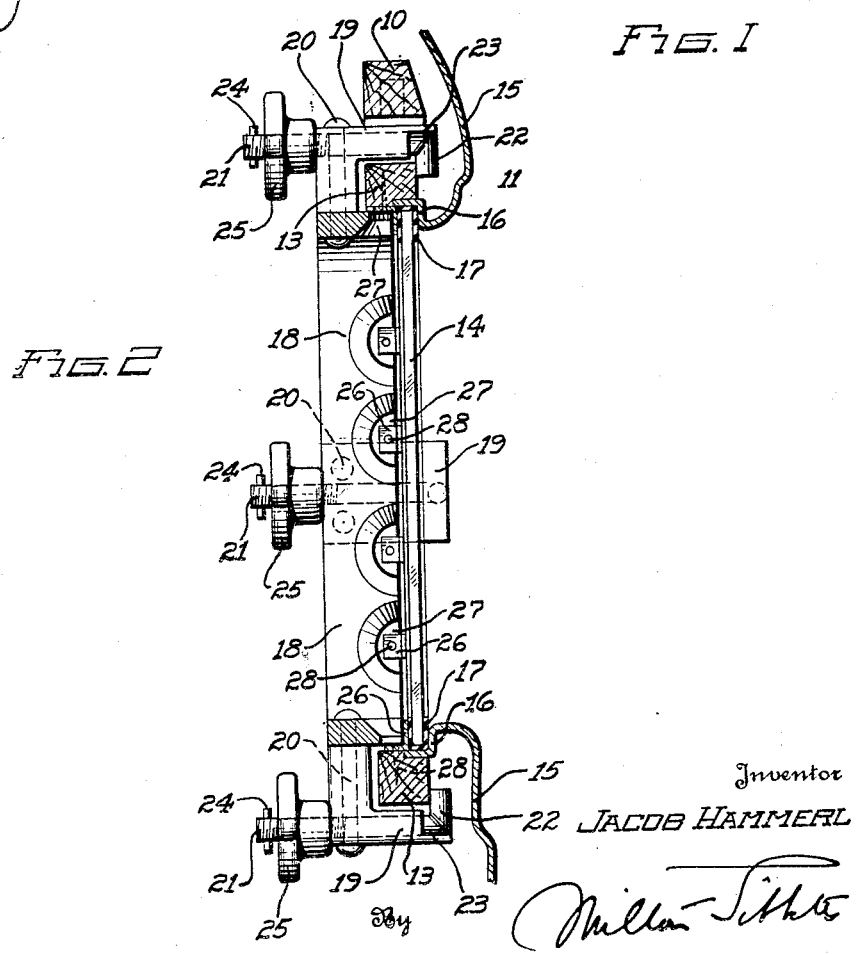
Fig. 2 is a vertical sectional view through the clamp and its associated parts taken on line 2—2 of Fig. 1.

Referring to the drawing, 10 indicates the cross beams and 11 the vertical beams of the rear portion of a closed type of automobile body frame. The beams 10 and 11 are secured together and provide a rectangular space within which the rear window frame is inserted. The window frame consists of vertically disposed side members 12, which are secured to the inner edges of the vertical beams 11, and horizontal members 13 which are spaced from the horizontal beams 10. The opening bounded by the window frame conforms substantially to the shape of the rear window glass 14 which is to be assembled therein. The rear body shell or panel 15 is formed with an opening coinciding with the window frame opening and the edges of the panel surrounding this opening are bent to extend into a recess around the outer portion of the window frame so that they are flush with the inner frame surface. The edges of the rear panel 15 surrounding the opening are also formed to present an abutment which in the present embodiment of the invention forms an inwardly extending molding 16 which serves as a stop for the glass 14. The window glass 14 is provided around its edges with a channel-shaped rubber molding or binding 17 which in the final assembly is brought into sealing contact with the molding portion 16 of the rear body panel 15.

Thus far the description has been confined to the usual and ordinary construction, but will now be extended to include the present invention.

For the purpose of temporarily securing the glass 14 in the window frame and against the molding, a clamping device is provided. This device includes a substantially rectangular frame 18 slightly smaller than the window frame and conforming substantially to the window glass 14 in shape and size. A series of L shaped brackets 19 are spaced substantially equidistantly about the frame 18 and are secured thereto by rivets 20 which extend from the inner side of the frame 18 through the brackets 19 to the outer side thereof. The stem portions 21 of detachable anchor members 22 extend through and are journaled in the horizontal legs of the brackets 19. The ends of the brackets 19 adjacent the anchor members 22 are cut away, as at 23, to allow rotational movement of the anchor members 22 therein. For the purpose of rotating the stems 21, handles 24 extend through the outer free ends thereof. Clamping nuts 25 are also provided on the outer threaded ends of the stems 21 and have a threaded engagement therewith for engaging the frame 18 to reciprocate the same toward and from the abutment.

The frame 18 is provided with spaced, tapered openings or notches 27 around the edges adjacent the glass to permit access to the window frame for permanently securing the glass assembly thereto while in its clamped position. For securing the glass to the window frame, small stamped metal cleats 26 of angular shape may be employed. The cleats 26 are adapted to be positioned adjacent the window glass 14 against the rubber molding 17 while the frame 18 is in its clamped position. The cleats 26 are provided with nail or screw holes which are exposed by the openings 27 in the frame 18 when the frame is in its clamping position. The cleats are secured to the window frame by nails or screws 28 which can be inserted in position through the openings 27 and hammered or screwed into a flush relation with the cleats, after which the device can be removed from the glass and the window frame. The cleats may be provided with elongated slots or openings so that they may be tacked or screwed in position to hold the glass in place while the clamps are being fitted, the slotted openings permitting the cleats to move inwardly as the clamp is tightened up.

In assembling the window glass, it is first fitted with the rubber channel binding and manually placed in the window frame against the molding 16, the clamping device is next applied to temporarily hold the glass pane in final position, and the permanent securing means are then applied through the openings 27 while the device is holding the entire binding enclosed edge of the glass pane under uniform pressure against the molding. In applying the clamping device, the anchor members 22 are rotated so that they will pass through the space between the beams 10 and 13 and past the beams 11 whereupon they are rotated to overlie the rear edges of the beams 13 and 11. The clamping nuts 25 are then screwed toward the anchor heads until the frame 18 tightly engages the entire rubber encased edge surface of the glass pane with an even or uniform pressure. By screwing the clamping nuts 25 gradually and in rotation around the frame the pressure of the frame can be applied uniformly and there will be no breakage of the glass and a tight endless engagement of the rubber with the molding will result. The cleats and tacks or screws for securing them are applied through the openings 27 in the frame to permanently secure the glass pane before the clamping device is released. After the clamping device has been removed and the trimming of the interior of the body has been completed, a window finish molding is inserted around the edges of the window glass on the interior of the body, thus completing the operation.

It will be seen that by the present invention a simple and efficient device has been provided for temporarily securing the window glass to the window frame. A frame has been provided with means associated therewith and detachably applicable to the window frame for moving the frame into the window frame opening and temporarily clamping the entire edge portion of the window glass against the abutment or molding associated with the window frame, together with means for permanently securing the window glass to the window frame while the glass is held in clamped position.

It will also be apparent that a device has been provided which will cause the window glass and its associated rubber binding to be brought into intimate sealing contact with the molding at all points and will allow the glass to be permanently secured to the window frame while in this position, all without the use of a sealing compound.

While only one specific embodiment of the invention has been herein shown and described, it will be quite apparent to one skilled in the art, that it is susceptible of numerous changes in construction and design without departing from the spirit or scope thereof which is to be limited only by the appended claims.

Having thus described the various features of this invention, what I claim and desire to secure by Letters Patent is:

1. A device for temporarily securing a window glass against a window frame abutment comprising a frame adapted to be moved into the window frame opening, and clamp means associated with the frame and adapted to be detachably applied to the window frame for moving the frame into the window frame opening to clamp the entire edge portion of the window glass against the abutment.

2. A device for temporarily securing a window glass against a window frame abutment comprising a frame adapted to be moved into the window frame opening, said frame having openings around the edge engaging the window glass to permit insertion of fastening means when the window glass is in position of final assembly, and means associated with the frame and adapted to be detachably applied to the window frame for moving the frame into the window frame opening to clamp the entire edge portion of the window glass against the abutment.

3. A device for temporarily securing a window glass against a window frame molding comprising a frame adapted to be moved into the window frame opening, and means associated with the frame and adapted to be detachably applied to the window frame for moving the frame into the window frame opening to clamp the window glass against the molding in final position with a uniform pressure around the entire edge portion of the window glass.

4. A device for temporarily securing a window glass to a window frame comprising a frame adapted to be moved into the window frame opening, and clamp mechanism having rotatable anchor members adapted to be removably anchored to the window frame and being adjustably associated with the frame for moving the frame into the window frame opening to uniformly press the entire edge portion of the window glass against the abutment.

5. A device for temporarily securing a window glass to a window frame comprising a frame adapted to be moved into the window frame opening, rotatable anchor members adapted to be removably anchored to the window frame and being associated with the frame, and clamp means for engaging the frame and threadedly engaging the anchor members for moving the frame into the window frame opening to uniformly press the entire edge portion of the window glass against the abutment.

6. The method of installing a window glass in a window frame having an abutment associated therewith, which comprises inserting the window glass into the window frame opening against the abutment, temporarily holding the window glass against the abutment under uniform pressure entirely around its edges, and permanently securing the window glass to the window frame while temporarily held against the abutment.

7. The method of installing a window glass in a window frame having an abutment associated therewith, which comprises inserting the window glass into the window frame opening and against the abutment, temporarily clamping the window glass against the abutment under uniform pressure entirely around its edges, permanently securing the window glass to the window frame while in temporary clamped position, and inserting a window finish molding around the inner edges of the window opening.

8. A device for temporarily securing a window glass to a window frame comprising a frame adapted to be moved into the window frame opening, brackets carried by and spaced substantially equidistantly around the edges of the frame, anchor members rotatably attached to the brackets and adapted to be removably anchored to the window frame, and clamping nuts threadedly engaging the anchor members and associated with the frame for moving the same into the window frame opening to press the window glass against the abutment.

In testimony whereof I affix my signature.

JACOB HAMMERL.